United States Patent [19]

Pipon et al.

[11] Patent Number: 4,896,398
[45] Date of Patent: Jan. 30, 1990

[54] DEVICE FOR INCREASING THE RESISTANCE OF MECHANISMS CONTROLLING THE POSITIONS OF A VEHICLE SEAT

[75] Inventors: Yves Pipon; Bernard Chales, both of Orne, France

[73] Assignee: A. & M. Cousin Etablissements Cousin Freres, Orne, France

[21] Appl. No.: 298,774

[22] Filed: Jan. 17, 1989

Related U.S. Application Data

[63] Continuation of Ser. No. 076,330, Jul. 22, 1987, abandoned.

[30] Foreign Application Priority Data

Jul. 26, 1986 [FR] France .................................. 86 10606

[51] Int. Cl.$^4$ .............................................. B60N 1/00
[52] U.S. Cl. ...................................... 16/337; 297/216
[58] Field of Search .................... 297/216, 379; 16/337

[56] References Cited

U.S. PATENT DOCUMENTS 4,634,181 1/1987 Pipon .................................. 297/379
4,634,182 1/1987 Tanaka ................................ 297/216

FOREIGN PATENT DOCUMENTS 2808889 9/1979 Fed. Rep. of Germany ...... 297/397

Primary Examiner—Richard K. Seidel
Attorney, Agent, or Firm—Becker & Becker, Inc.

[57] ABSTRACT

A device for increasing the resistance and durability of an articulation mechanism, usable to control the position of a seat, includes a fixed flange rigidly connected with the seat and a movable flange rigidly connected with the movable part of the seat; these two flanges are rotatable with respect to each other by a mechanical assembly with a locking by suitable mechanism. The fixed flange carries, close to its periphery, a fine toothing that is not normally in contact with a fine continuous circular toothing provided on a peripheral circular element of the movable flange, these fine continuous circular toothings coming in contact with each other along a given length when the articulation mechanism is distorted as a consequence of a sudden shock.

3 Claims, 3 Drawing Sheets

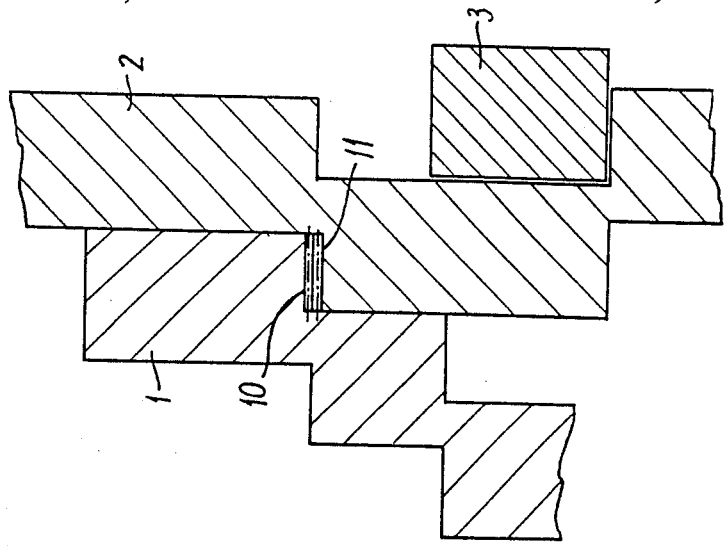
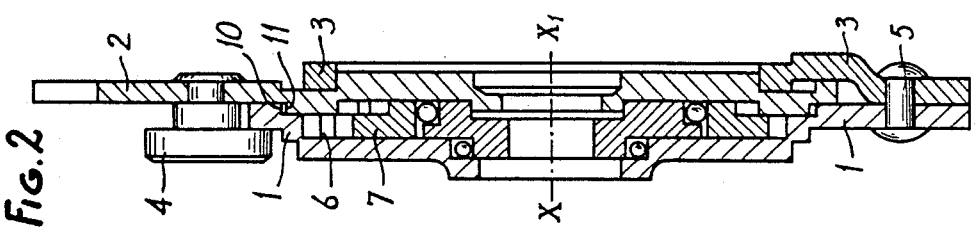
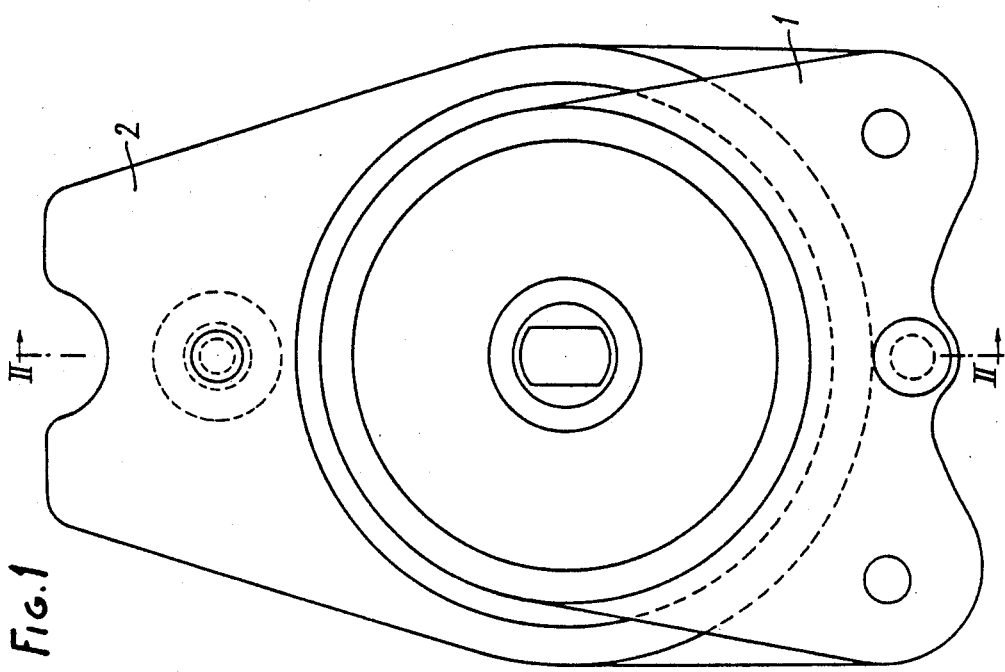

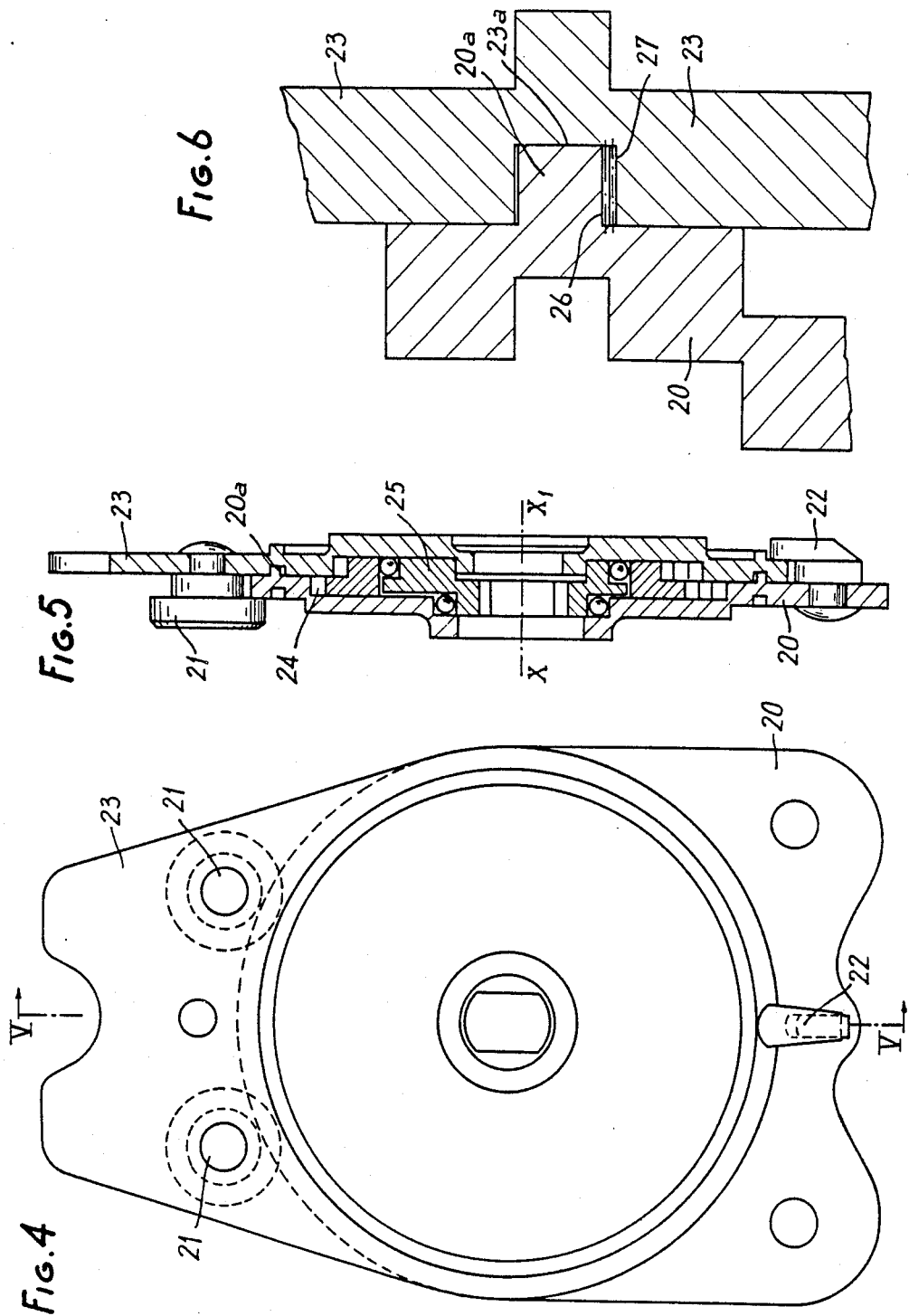

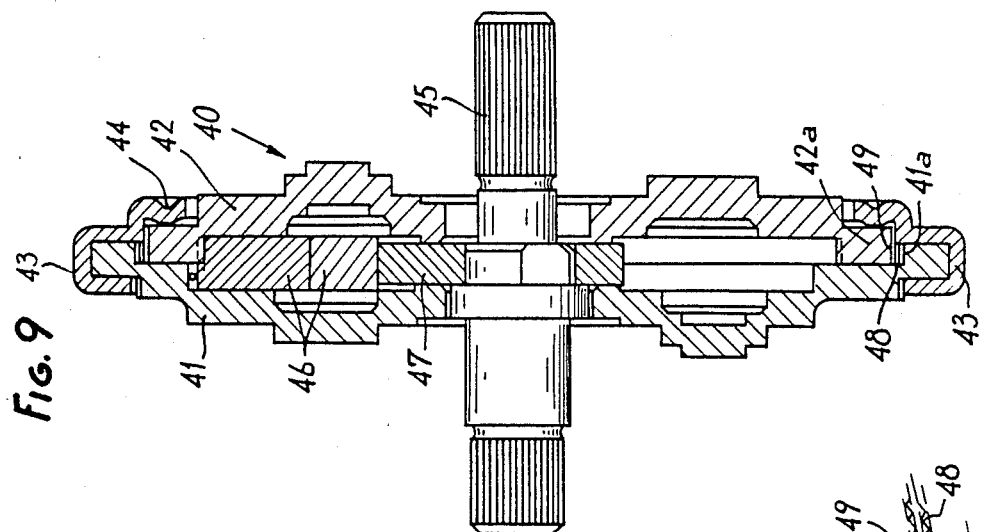
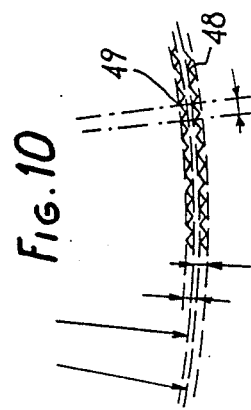
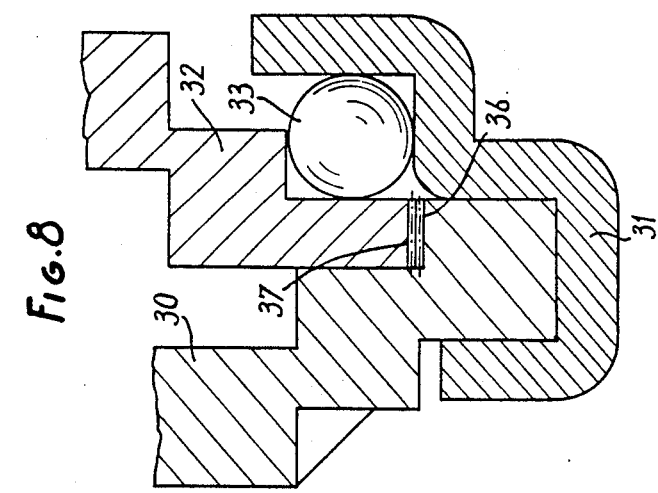
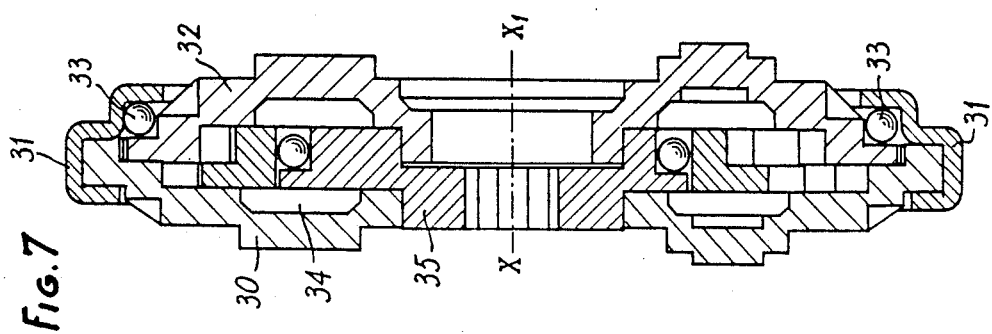

DEVICE FOR INCREASING THE RESISTANCE OF MECHANISMS CONTROLLING THE POSITIONS OF A VEHICLE SEAT

This is a continuation application of copending parent application Ser. No. 076,330-Pipon et al, filed July 22, 1987, now abandoned.

BACKGROUND OF THE INVENTION

1. Field of the Invention

For a long time, articulation devices have already been known that are positioned between the seating portion and the back portion of a seat in order to obtain a desired tilting angle of the back portion with respect to the seating portion.

These devices are also utilized to raise seats, i.e. to control both the tilting angle and the height of the seating portion of a seat. The motion is, besides, normally called "control of the seat position".

2. Description of the Prior Art

The mechanisms used, that are either continuous or discontinuous, include fixed parts and movable parts, interlinked by means of different mechanical members which are submitted to numerous stresses mainly in case of accidental shocks resulting in the disassembly by rupture of some members such as toothings, cams rolls, gears, etc. used to link together the fixed portions and the movable portions and to define the relative positioning of the two portions of the seat or of the seat itself, accordingly as the back portion or the position of the seat is to be controlled.

In the event these mechanisms are subjected to stresses exceeding the normal allowable stresses, in a first phase, in the area that contributes to positioning, reversible deformations or settlements in positioning and strains occur but not leading to rupture or breaking-off of mechanisms, and in such circumstances, it is possible to succeed, by various means, in taking up the deformations and strains to avoid mechanisms from breaking-off or being slashed and having deformations or bendings from being formed in this manner.

But, in the presence of far more severe stresses, strains or even ruptures occur leading to an almost complete destruction of these mechanisms. This is considered as being of very great importance since the seats and their components must resist very strong stresses as, very often, in modern vehicles, the safety belts are integral with these seats.

The present invention overcomes these inconveniences and difficulties by providing mechanisms built in order to provide a temporary locking of the movable parts with respect to the fixed parts, in the presence of high stresses, without any permanent strain or rupture so that when these stresses are terminated, the different members of the mechanism involved therewith are practically brought back to their previous position without any hysteresis and are thus ready for a new normal operation.

SUMMARY OF THE INVENTION

According to the invention, the articulation mechanism is usable to control the tilting angle of the back portion of the seat or the height of the seats in order to control the position of the seating portion, such a mechanism including a fixed flange rigidly connected with the fixed member of the seat and a movable member or flange rigidly connected with the other movable part of the seat. The two flanges are rotatable with respect to each other by a continuous or discontinuous mechanical assembly with a locking by all suitable means, with the mechanism further being characterized in that the fixed flange carries, close to its periphery, a first fine continuous circular toothing that is not normally in contact with a second fine continuous circular toothing provided on a peripheral circular element of the movable flange. These first and second fine continuous circular toothings come in contact with each other along a given length when the articulation mechanism is distorted as a consequence of a sudden shock in order to increase the resistance and to avoid strains, deformations, and ruptures that could bring about destruction of these mechanisms.

According to another characteristic of the invention, the fine toothing of the fixed flange is located over an internal peripheral zone of this fixed flange, and the fine toothing of the corresponding movable flange is located over an internal zone of the latter.

Different other features of the invention will moreover appear from the following detailed description.

Embodiments in accordance with the object of the invention are shown, by way of non limiting examples, in the accompanying drawings.

BRIEF DESCRIPTION OF THE DRAWINGS

FIG. 1 is a front view of an elongated flange articulation including an epicyclic mechanism to move the movable flange with respect to the fixed flange.

FIG. 2 is a view that shows a longitudinal cross section almost along line II—II of FIG. 1.

FIG. 3 is a very large scale view, in cross-section, of an upper portion of the articulation shown in FIG. 2.

FIG. 4 is a view that shows another elongated flange articulation controlled by an epicyclic train in an alternative embodiment.

FIG. 5 is a view that shows a cross-section taken substantially along line V—V of FIG. 4.

FIG. 6 is a view, at a very large scale, of the upper portion of the articulation shown in cross-section in FIG. 5.

FIG. 7 is a view that shows a cross-section of a second alternative articulation with circular flanges controlled by an epicyclic train.

FIG. 8 is a large scale view of the lower portion of the articulation in FIG. 7.

FIG. 9 is a view that shows a diametral cross-section of a third alternative of the articulation provided with a cam roll locking.

FIG. 10 is a very large scale view of the lower portion of FIG. 9 showing the type of reinforcing toothing used in all the mentioned cases.

DETAILED DESCRIPTION OF THE INVENTION

In FIG. 1, there is shown an articulation having elongated flanges, the flange 1 that is integral with the seating portion being fixed, and the upper flange 2 being movable, i.e. integral with the back portion.

The rotation axis of the back portion with respect to the sealing portion follows the line $x-x_1$ as can be seen in FIG. 2, which shows the movable flange 2 is held over the fixed flange 1, at its lower portion by a semi-circular lining 3 and at its upper portion by a plot 4.

A rivet 5 secures the semi-circular lining 3 over the lower portion of the fixed flange 1. The movable flange 2 and the fixed flange 1 define therebetween a volume or chamber 6 containing a mechanism 7, that, here, is an epicyclic mechanism, defining by an accordingly well known means, an angular displacement of the movable flange 2 with respect to the fixed flange 1.

When considering FIG. 3, it can be seen that the lower periphery of the fixed flange 1 carries a fine toothing 10 opposed to another fine toothing 11 borne by the corresponding portion of the movable flange 2. These two very close fine toothings are not engaged with each other during the relative motions of the fixed and movable flanges owing to the fact that a small gap remains between these toothings 10 and 11. In other words, these two very close fine toothings are not contacting one another during normal operation of the articulation mechanism and no matter the position of the movable flange 2 with respect to the fixed flange 1, rather they are being adapted to contact one another along a given length when the articulation mechanism is distorted resiliently as a consequence of a sudden shock, in order to increase the resistance and durability to avoid deformations and ruptures that could bring about destruction of the mechanism. But, when a powerful stress is encountered, for instance if the vehicle, inside which are installed seats provided with these articulations, is subjected to a shock, the fixed flange 1 and movable flange 2 can be brought closer along a portion of the periphery of the fine toothings 10 and 11 that then become engaged with each other and thus increase the resistance of the assembly since at this time these two main parts of the articulation are strongly pressed over each other, i.e., over a large contact surface, thus achieving a high strength and then a high safety.

In FIG. 4, again is shown a fixed elongated flange 20, integral with the seating portion and held by means of plots, pawls or border pieces 21, 22 over the movable flange 23, also configured in order to form an internal chamber 24 that contains the mechanism 25 intended to rotate the movable flange 23 with respect to the fixed flange 20. The rotation is effected about the axis x-x$_1$ (see FIG. 5).

As shown in FIG. 6, the fixed flange 20 presents a circular crown 20a that penetrates into a circular groove 23a machined in the movable flange 23 and, just as in the preceding case, the circular crown 20a presents, over its internal face, a fine toothing 26 opposed to an external fine toothing 27, formed in the circular groove 23a of the movable flange 23. Just as in the previous case, during strong stresses, the toothing 26, 27, by engaging each other over a large surface, increase considerably the resistance of the articulation.

Finally, FIG. 7 shows a cylindrical articulation with a fixed flange 30 held by means of a crimping ring 31, a movable flange 32, and a ball bearing 33 inserted between the crimping ring 31 and the movable flange 32.

The recessed zone forming a chamber 34 delimited by the fixed flange 30 and the movable flange 32 houses a mechanism 35, intended, in a manner known per se, to move the movable flange 32 with respect to the fixed flange 30. This displacement is oriented along the axis x-x$_1$ (see FIG. 7).

Just as in the preceding case, the external bottom of the fixed flange 30 bears a fine toothing 36 that normally is never in contact with the toothing 37, borne by the external periphery of the movable flange 32; these two toothings are in contact only in the presence of strong stresses exceeding the normal ones.

the articulation shown in FIG. 7 and 8, called cylindrical or circular articulation, can be controlled by a known type of reversible or irreversible mechanism, in particular by an epicyclic train.

In FIG. 9, the articulation 40, also circular, is a discontinuous articulation with cam rolls; its circular fixed flange 41 and its circular movable flange 42 are shown, this assembly being held by a crimping ring 43 that has a circular distortion 44 and hence strongly holds the movable flange 42 over the fixed flange 41.

The central cam 47, driven by a shaft 45, controls the positioning of the composite cam rolls 46 to adjust the wanted tilting angle of the back portion with respect to the seating portion.

Just as in the previous cases, there is provided (see FIG. 9 and 10) over the circular internal lower portion 41a of the fixed flange 41 a fine toothing 48 and, on the external peripheral portion 42a of the movable flange 42, a fine toothing 49, the function of which has already been explained for the previous cases. As stated above, when stresses are exerted upon the articulation devices, in particular upon the articulation devices of the back portion of a vehicle seat, the mechanism areas that control the relative positioning of the fixed and movable parts are submitted to stresses and the disassembly occurs through a disrupture of the areas, especially of the cam roll toothings that are used to interlink these fixed and movable parts and to control their relative positioning.

When stresses are exerted upon these mechanism, in a first phase, the area, intended for positioning, is subjected to settlements (taking up slashes) and reversible distortions (teeth buckling without breaking), but causes an axial relative displacement between the fixed and movable parts. The safety factors allow for the difference between the links of the fixed and movable parts and thus a relative displacement without any fatal accident occurring. But in the presence of a far more severe stress, the different parts can be broken and therefore the cooperating toothings 10, 11 (see FIG. 3), 26, 27 (see FIG. 6), 36, 37 (see FIG. 8), 48, 49 (see FIG. 9 and 10) establish a direct contact between the fixed and movable parts owing to the fact that these toothings are intermeshing.

There is then a direct anchoring of the fixed and movable parts of the mechanism through the teeth that absorb stresses, and the linking device is no longer subjected to any additional stress. When the stress decreases, the linking member (teeth, cam rolls, etc.) which is unbroken as it has not been subject to stresses exceeding a reversible distortion, is brought back to its initial position and lets the mechanism exert its function of positioning the movable part with respect to the fixed part.

it can thus be seen that the resistance of the mechanism, and the safety of devices fitted with this mechanism, is increased considerably and no longer relies on the resistance of the linking member but on a direct hooking between the fixed and movable parts without destroying the linking member inasmuch the direct link between teeth is not broken off.

The present invention is, of course, in no way restricted to the specific disclosure of the specification and drawings, but also encompasses any modifications within the scope of the appended claims.

What is claimed is:

1. In a device for increasing the resistance and durability of an articulation mechanism used to control the tilting angle of the back portion of a seat, or the height of the seat, in order to control the position of the seating portion, such articulation mechanism including a fixed first flange rigidly connected with a fixed member of the seat, and a movable second flange rigidly connected with another movable part of the seat, said first and second flanges being rotatable relative to one another via a continuous or discontinuous mechanical assembly having a temporary locking of said movable part with respect to the fixed part, comprising the improvement in combination therewith wherein:

said fixed first flange has a peripheral portion, in the vicinity of which is provided a first fine continuous circular toothing, and said second movable flange has a peripheral circular element that is provided with a second fine continuous circular toothing, with said first and second fine continuous circular toothings facing each other along all peripheries thereof although not contacting one another during normal operation of said articulation mechanism and no matter the position of the movable flange with respect to the fixed flange, but rather being adapted to contact one another in meshing relationship particularly along a given length in said position of the movable second flange with respect to the fixed first flange, when said articulation mechanism is temporarily distorted resiliently as a consequence of a sudden shock, in order to increase the resistance and durability so that said first and second fine continuous circular toothings under a small torque reactivate said fixed first flange and said movable second flange to avoid deformations and ruptures that could bring about destruction of said mechanism, means via which cylindrical or circular articulation is controlled by a reversible-irreversible mechanism which is an epicyclic train.

2. A device in combination according to claim 1, in which said fixed first flange has an inwardly directed peripheral portion over which said first fine continuous circular toothing is provided, and said movable second flange has a corresponding outwardly directed peripheral portion over which said second fine continuous circular toothing is provided.

3. A device in combination according to claim 1, in which said fixed first flange is integral with the seating portion and held by means of plots as border pieces installed over said movable second flange also in a configuration that forms an internal chamber that contains mechanisms intended to rotate said movable second flange with respect to said fixed first flange with rotation being effected about a predetermined axis extending transversely relative to said movable second flange.

* * * * *

UNITED STATES PATENT AND TRADEMARK OFFICE
CERTIFICATE OF CORRECTION

PATENT NO. : 4,896,398
DATED : 30 January 1990
INVENTOR(S) : Yves Pipon et al

It is certified that error appears in the above-identified patent and that said Letters Patent is hereby corrected as shown below:

On the Title/Abstract page, the Foreign Application Priority Data at [30] should read:

Jul. 22, 1986 [FR]    France.......86 10606

Signed and Sealed this

Fifteenth Day of January, 1991

*Attest:*

HARRY F. MANBECK, JR.

*Attesting Officer*    *Commissioner of Patents and Trademarks*